US010125661B2

(12) United States Patent
Clement et al.

(10) Patent No.: US 10,125,661 B2
(45) Date of Patent: Nov. 13, 2018

(54) DEVICE FOR CONTROLLING THE SUPPLY OF A FLUID TO A SYSTEM ALLOWING FLUID CONSUMPTION TO BE OPTIMISED

(71) Applicant: Bontaz Centre R & D, Marnaz (FR)

(72) Inventors: Denis Philippe Clement, Mieussy (FR); Stéphane Pascal Perotto, Ayse (FR)

(73) Assignee: BONTAZ CENTRE R&D, Marnaz (FR)

( * ) Notice: Subject to any disclaimer, the term of this patent is extended or adjusted under 35 U.S.C. 154(b) by 38 days.

(21) Appl. No.: 14/783,534

(22) PCT Filed: Apr. 11, 2013

(86) PCT No.: PCT/FR2013/050789
§ 371 (c)(1),
(2) Date: Oct. 9, 2015

(87) PCT Pub. No.: WO2014/167190
PCT Pub. Date: Oct. 16, 2014

(65) Prior Publication Data
US 2016/0047290 A1    Feb. 18, 2016

(51) Int. Cl.
*F01P 3/08* (2006.01)
*F16K 1/42* (2006.01)
(Continued)

(52) U.S. Cl.
CPC *F01P 3/08* (2013.01); *B05B 1/02* (2013.01); *F01P 7/14* (2013.01); *F16K 1/42* (2013.01);
(Continued)

(58) Field of Classification Search
CPC ........ F01P 3/08; F01P 7/14; F01P 3/06; F16K 15/02; B05B 1/02; F01M 1/08
See application file for complete search history.

(56) References Cited

U.S. PATENT DOCUMENTS 3,457,949 A   7/1969   Coulter
4,995,346 A   2/1991   Hudson, Jr.
(Continued)

FOREIGN PATENT DOCUMENTS

DE   10 2007 039109 A1   2/2009
EP    2 549 159 A1        1/2013
(Continued)

OTHER PUBLICATIONS

Office Action issued in Japanese Patent Application No. 2016-507020 dated Feb. 14, 2017.
(Continued)

*Primary Examiner* — Jacob Amick
(74) *Attorney, Agent, or Firm* — Pearne & Gordon LLP

(57) ABSTRACT

Cooling spray jet comprising a supply inlet, a discharge outlet, a reaming connecting the inlet and the outlet, the outlet having a given cross-sectional area, a valve comprising a plug free to slide in the reaming and bearing in contact with a valve seat in a closed state. The valve has two open states after a first phase in which the plug separates from the valve seat, with different ranges of fluid pressures, the cross-sectional area between the plug and the reaming of each opening state being different from the cross-sectional area of the other state, one of these opening states having a cross-sectional area that regulates the fluid flow at the discharge outlet and the other opening state having a cross-sectional area such that the flow is regulated by the cross-sectional area of the outlet.

12 Claims, 7 Drawing Sheets

(51) Int. Cl.
 *F16K 15/02* (2006.01)
 *F16K 17/04* (2006.01)
 *F16K 25/00* (2006.01)
 *B05B 1/02* (2006.01)
 *F01P 7/14* (2006.01)
 *F16K 27/02* (2006.01)

(52) U.S. Cl.
 CPC ............ *F16K 15/02* (2013.01); *F16K 15/025* (2013.01); *F16K 17/04* (2013.01); *F16K 25/00* (2013.01); *F16K 27/0209* (2013.01); *F01P 2007/146* (2013.01)

(56) References Cited

U.S. PATENT DOCUMENTS

| | | | |
|---|---|---|---|
| 5,533,472 A | 7/1996 | Sands | |
| 5,915,345 A | 6/1999 | Kling | |
| 7,350,484 B2* | 4/2008 | Bontaz | F01M 1/08 |
| | | | 123/196 R |
| 7,559,296 B2 | 7/2009 | Perotto | |
| 2002/0014543 A1 | 2/2002 | Ness | |
| 2008/0210314 A1 | 9/2008 | Neto | |
| 2008/0223318 A1* | 9/2008 | Perotto | F01P 3/08 |
| | | | 123/41.35 |
| 2013/0152883 A1 | 6/2013 | Perotto | |
| 2014/0305392 A1 | 10/2014 | Clement | |

FOREIGN PATENT DOCUMENTS

| | | |
|---|---|---|
| FR | 2 913 723 A1 | 9/2008 |
| JP | H07-317519 A | 12/1995 |
| JP | 2011-064155 A | 3/2011 |

OTHER PUBLICATIONS

International Preliminary Report on Patentability issued in Application No. PCT/FR2013/050789 dated Jul. 21, 2015.
International Search Report issued in Application No. PCT/FR2013/050789 dated Jul. 16, 2013.

* cited by examiner

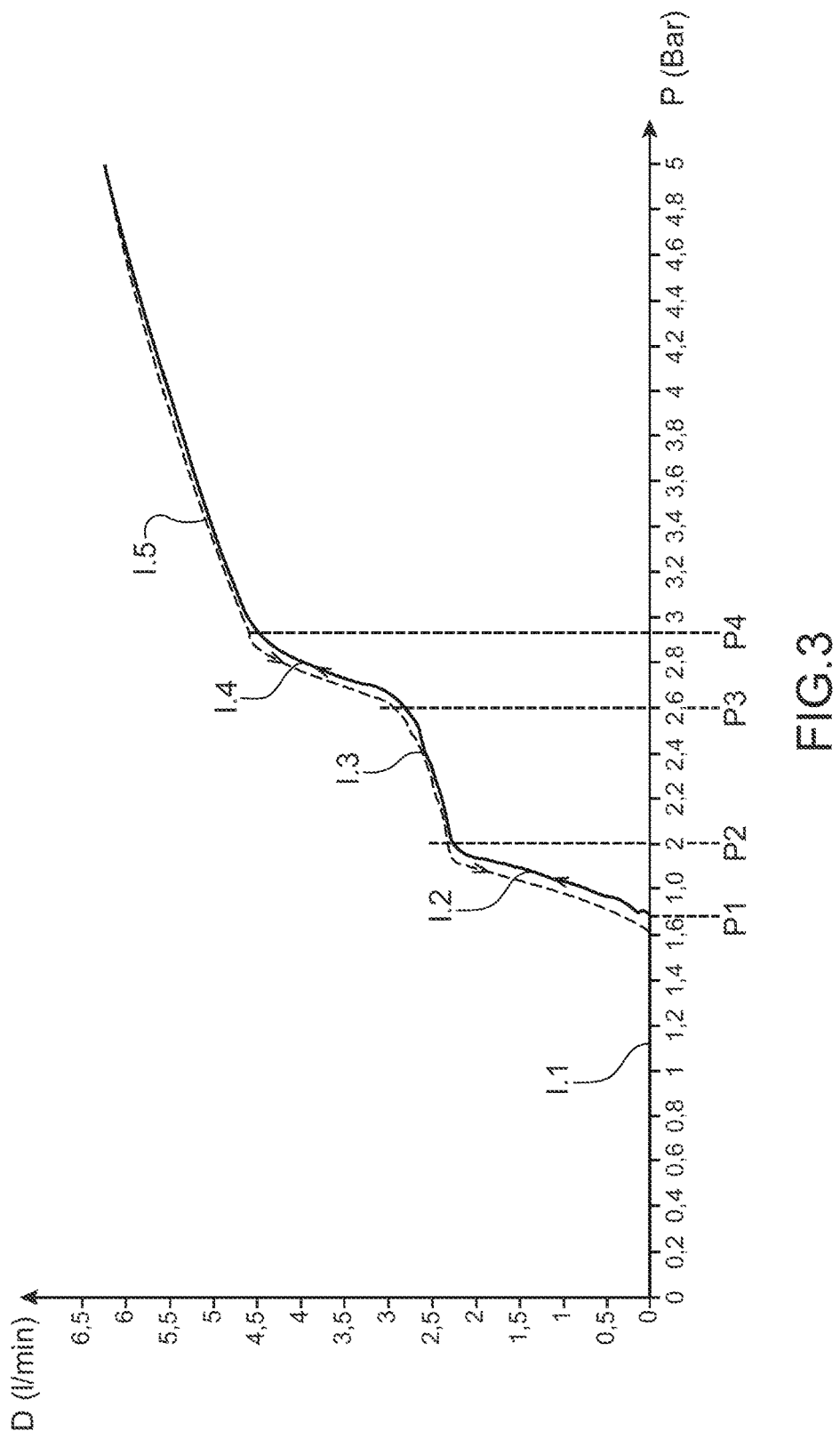

DEVICE FOR CONTROLLING THE SUPPLY OF A FLUID TO A SYSTEM ALLOWING FLUID CONSUMPTION TO BE OPTIMISED

TECHNICAL FIELD AND PRIOR ART

This invention relates to a device for controlling the supply of a fluid to a system by which fluid consumption can be optimised, for example a device for controlling the supply of oil to piston cooling spray jets in an internal combustion engine.

Internal combustion engines are increasingly fitted with piston cooling spray jets, the role of which is to direct oil under pressure from the engine lubrication circuit underneath the pistons to cool them so that they do not lose their mechanical properties. These cooling spray jets are large oil consumers in the engine. This oil under pressure is forced into the cooling spray jets by a pump. In general, an attempt is made to reduce the energy consumed, for example by reducing energy consumed by operation of the pump. This is done by attempting to improve control over oil consumption and oil pressure.

In general, pumps used to supply cooling spray jets have a variable capacity which provides means of controlling the engine oil pressure.

A cooling spray jet operates as follows: it is closed when the supply pressure is less than a minimum value and then it does not deliver oil. Above this minimum value, the spray jet outputs a given flow of oil at a given pressure. It is also required that the spray jet should output an oil flow at a precise location on the piston with a maximum jet velocity. Therefore it is also required to reduce head losses.

A cooling spray jet according to the state of the art consists of a body with one end connected to a source of oil under pressure and another end formed by the free end of the spray jet transferring the oil jet to the bottom of the piston. A valve is inserted between these two ends, the valve comprising a valve seat and a plug, the plug being brought into contact with the valve seat by means of a spring. When the oil pressure at the supply end is greater than the fixed minimum value, the plug moves away from the valve seat allowing oil to flow under pressure towards the end of the spray jet facing the bottom of the piston.

When the valve is open, after a transient phase in which the flow increases quickly, the flow variation at the spray jet output as a function of the supply oil pressure is a linear function and is regulated by the cross-sectional area of the spray jet outlet.

It is desirable to make a spray jet that will output a flow that does not vary in a linear manner in order to optimise cooling and consumption of the pump.

PRESENTATION OF THE INVENTION

Consequently, the purpose of this invention is to provide a device to control the supply of a fluid to a system capable of providing a more complex variation in the output fluid flow as a function of the pressure than is possible with control devices according to the state of the art.

The purpose described above is achieved by a device to control the supply of a fluid to a system comprising a valve including a valve seat and a plug inserted between a supply inlet of the fluid under pressure and a discharge outlet of the fluid under pressure, this outlet having a given cross-sectional area. When the pressure is less than a minimum value, the valve is closed. Above this minimum value, the plug and/or the reaming in which the plug is mounted free to move, are configured such that after a phase in which the plug separates from the valve seat, the valve has several opening states dependent on the pressure, the cross-sectional area of each of these states being different from the cross-sectional areas of the other open states, at least one of these sections being such that it regulates the flow at the discharge outlet, and at least one other of these sections being such that the flow at the discharge outlet is regulated by the outlet cross-section.

In one preferred embodiment, the cross-section of the open state following the separation phase is such that it regulates the fluid flow and the cross-sectional area of the opening state corresponding to higher pressures is such that the outlet section regulates the flow.

In other words, a valve is made with at least two different cross-sectional areas, one of these cross-sections being smaller than the outlet cross-section such that it is the limiting section regulating the flow, and the other cross-section being larger than the outlet cross-section such that the outlet section is the limiting section that regulates the flow.

Advantageously, the profile defining the limiting cross-sectional area is in the reaming.

This invention is particularly useful for making a cooling spray jet or to control the supply to one or several cooling spray jets.

Therefore, the purpose of this invention is a device to control the supply of a fluid from a source under pressure to a system, comprising a supply inlet for the fluid under pressure, a discharge outlet for the fluid under pressure, a reaming connecting the supply inlet and the discharge outlet, said discharge outlet having a given cross-sectional area, a valve comprising a plug installed free to slide in said reaming and bearing in contact with a valve seat, formed in the reaming in the closed state. The valve comprises several opening states after a first phase in which the plug separates from the valve seat, each opening state corresponding to a different range of fluid pressure values, the cross-sectional area between the plug and the reaming in each opening state being different from the cross-sectional areas of the other states, at least one of these opening states having a cross-sectional area such that it regulates the fluid flow at the discharge outlet and at least one of these opening states having a cross-sectional area such that the flow is regulated by the cross-sectional area of the discharge outlet.

Preferably, the open state with a cross-sectional area such that the flow is regulated by the cross-sectional area of the discharge outlet is the open state for which the range of pressure values includes the highest pressure values.

According to another characteristic, the reaming may have increasing cross-sectional areas starting from the valve seat along the direction of fluid flow. For example, the reaming comprises a first portion forming the valve seat, at least one second portion that together with the plug delimits a cross-sectional area smaller than the cross-sectional area of the discharge outlet and a third portion that together with the plug delimits a cross-sectional area larger than the cross-sectional area of the discharge outlet, said first, second and third sections being arranged in this order along the direction of fluid flow. The reaming may comprise several second cross-sections, said second cross-sections being arranged along the direction of fluid flow such that together with the plug they delimit increasing cross-sectional areas along the flow direction.

In one example embodiment, the second portion has a cylindrical portion and the third portion has a tapered portion.

In another example embodiment, the at least one second portion together with the plug delimits a variable cross-sectional area.

Another purpose of this invention is a cooling system for at least one piston of an internal combustion engine comprising at least one cooling spray jet and a control device according to the invention, the control device being located between the source of fluid under pressure and the at least one spray jet, the discharge outlet being formed by a free end of the spray jet.

Another purpose of the invention is a cooling spray jet for a piston of an internal combustion engine comprising a control device according to the invention, said device being included in the body of the spray jet, the discharge outlet being formed by a free end of the spray jet.

BRIEF DESCRIPTION OF THE DRAWINGS

This invention will be better understood after reading the following description and the appended drawings in which:

FIG. 3 is a graphic view of the flow variation in l/min at the outlet from the cooling spray jet in FIGS. 2A to 2D as a function of the pressure in bars.

DETAILED PRESENTATION OF PARTICULAR EMBODIMENTS

Figure 1A:
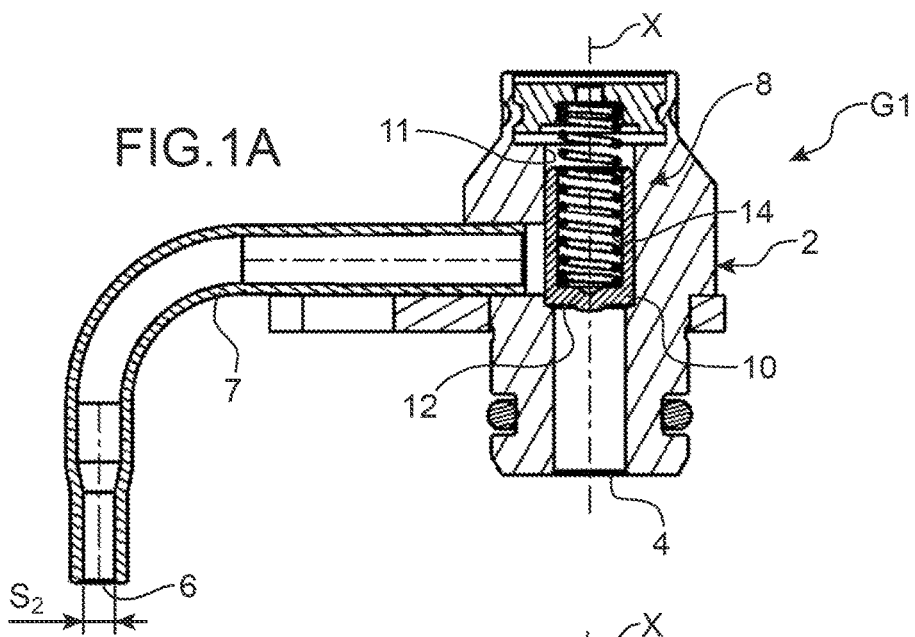
FIG. 1A is a cross-sectional view of an example embodiment of a cooling spray jet according to this invention in a closed state.
Figure 1B:
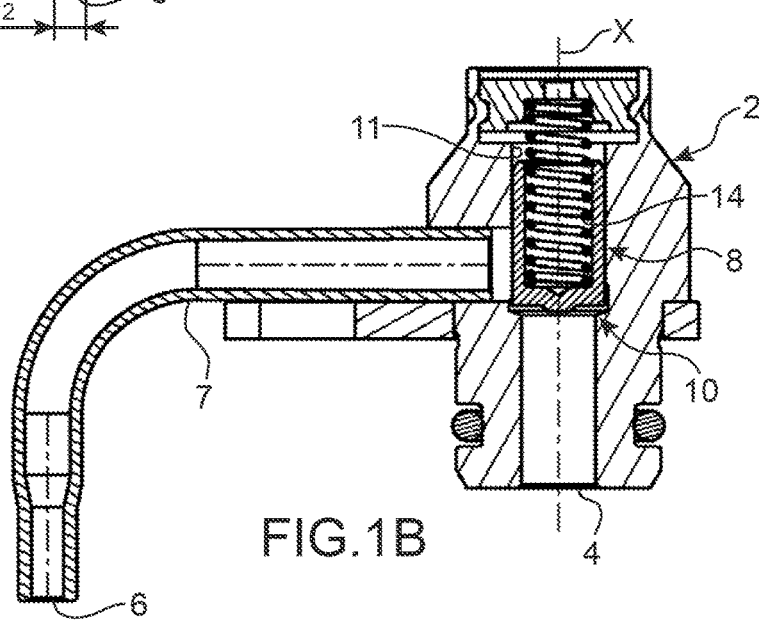
FIG. 1B is a cross-sectional view of the cooling spray jet in FIG. 1A in a first regulation state.

In the following description, the control device is applied to a cooling spray jet of a piston of an internal combustion engine. But this invention is applicable to all fields using fluids and requiring control of their supply. For simplification reasons we also use the term "oil" to denote the fluid circulating through the device but it will be understood that this invention is not limited to the supply of oil and it includes any other fluid that can circulate and for which the flow can be regulated.

The spray jets shown in FIGS. 1A to 1D and in FIGS. 2A to 2D are designed to be placed between a pressurised fluid source, for example the engine lubrication circuit, and the bottom of a piston in an internal combustion engine. The cooling spray jet is designed to spray oil in contact with the bottom of the piston (not shown).

Spray jet G1 in FIGS. 1A to 1D comprises a body 2 with a first end 4 that will be connected to a pressurised fluid source (not shown) and a second discharge end 6. In the example shown, the evacuation end is formed from the free end of a spray jet tube 7 connected to the body 2.

The free end of the tube 6 has a cross-sectional area S2.

The cooling spray jet also comprises a valve 8 comprising a plug 10 mounted free to move along an axis X in a reaming 11 of the body 2 and a valve seat 12 in contact with which the plug 10 rests in a closed state of the spray jet.

The plug 10 is returned elastically into contact with the valve seat 12 through an elastic means 14 formed by a spring in the example shown. The spring 14 is adjusted such that the plug lifts from the valve seat 12 at a given pressure value denoted P1 below which the spray jet is closed. The supply oil pressure fixes the position of the plug along the axis X in the reaming 11.

Figure 1C:
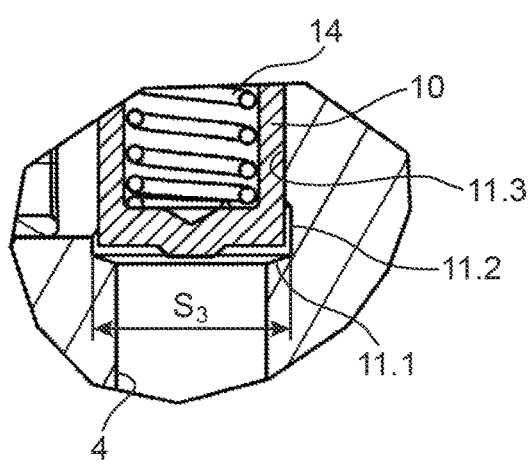
FIG. 1C is a detailed view of FIG. 1B.

As can be seen in FIG. 1C, the profile of the reaming 11 is such that after the valve opening phase, it delimits two fluid cross-sectional areas along the discharge outlet direction as a function of the longitudinal position of the plug in the reaming 11.

In the example shown in FIG. 1C, following the oil flow direction, the reaming comprises a first portion 11.1 with a tapered shape forming the valve seat 12, a second cylindrical portion 11.2 with a circular cross-section, and a third tapered portion 11.3 such that the cross-section of the reaming increases along the oil flow direction.

In the position shown in FIG. 1C, the cross-sectional area of the fluid passage between the plug 10 and the reaming is delimited by the cylindrical section 11.2, this cross-sectional area will be denoted S3.

Figure 1D:
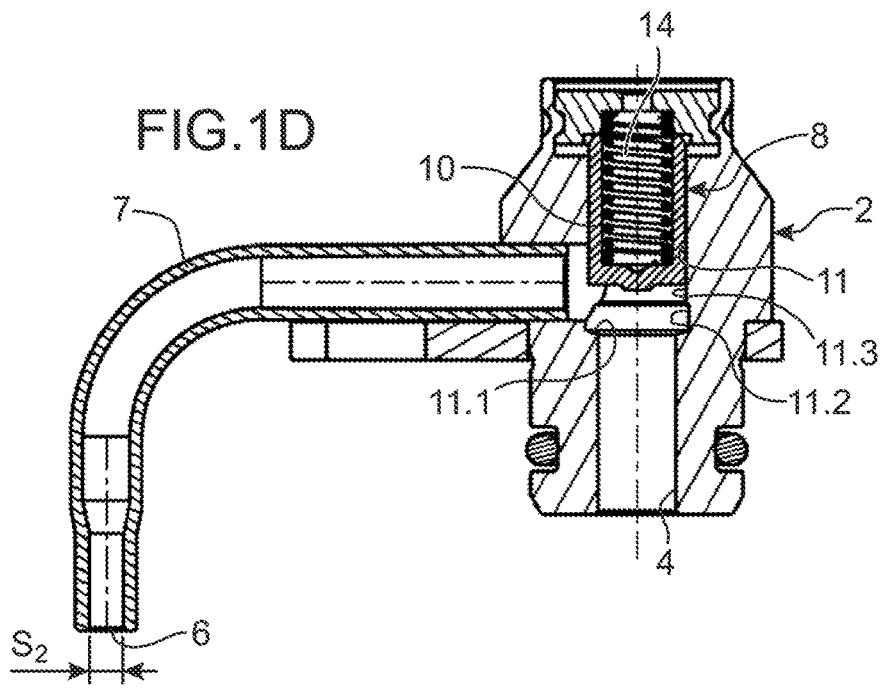
FIG. 1D is a cross-sectional view of the cooling spray jet in FIG. 1A in a second regulation state.
Figure 2A:
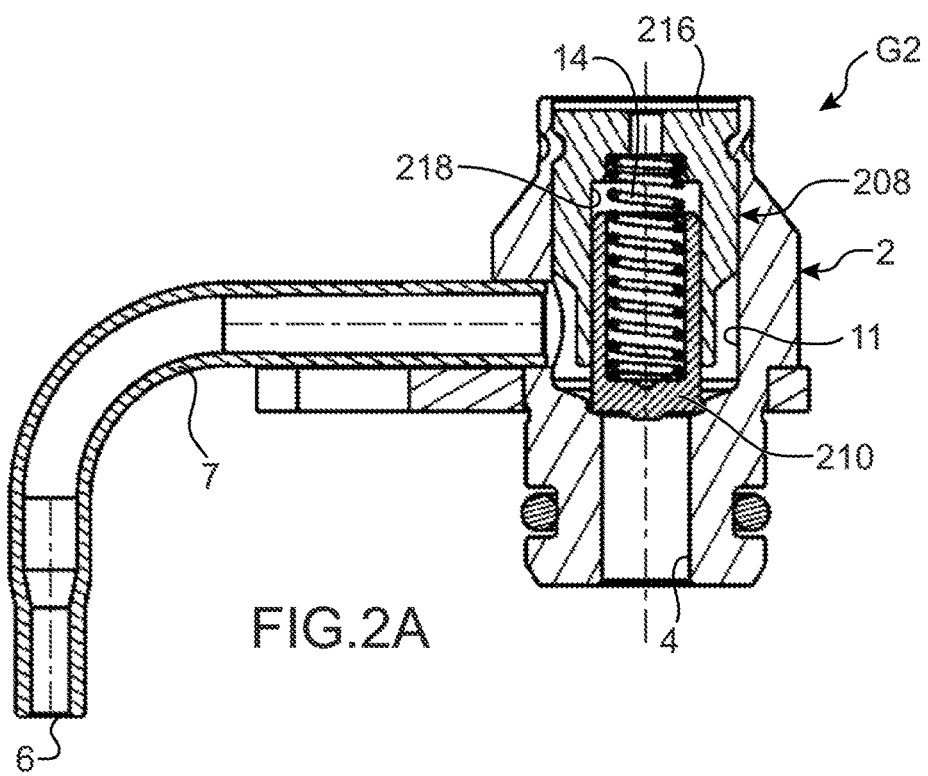
FIG. 2A is a cross-sectional view of another example embodiment of a cooling spray jet according to this invention in a closed state.
Figure 2B:
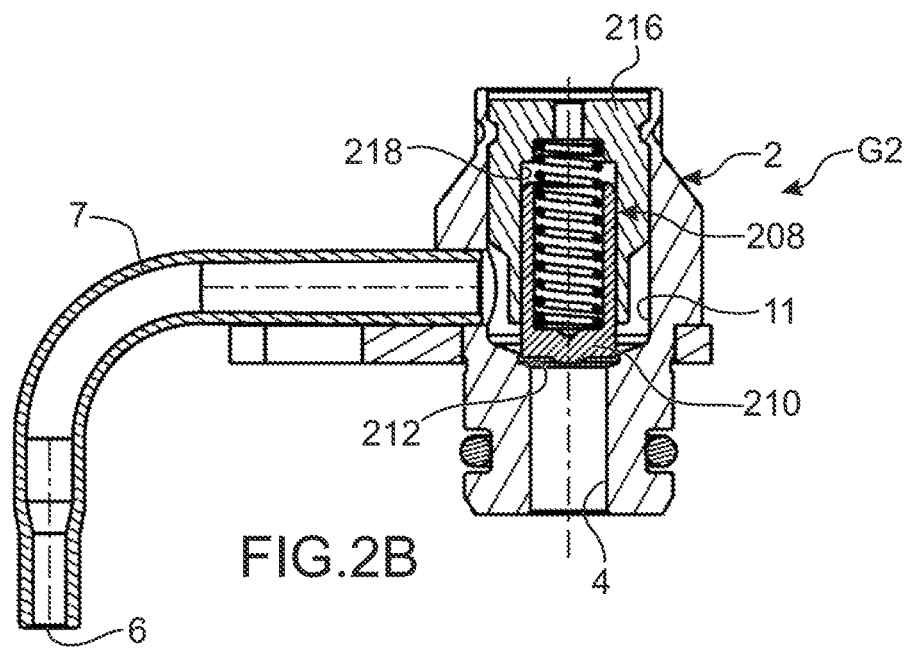
FIG. 2B is a cross-sectional view of the spray jet in FIG. 2A in a first regulation state.
Figure 2C:
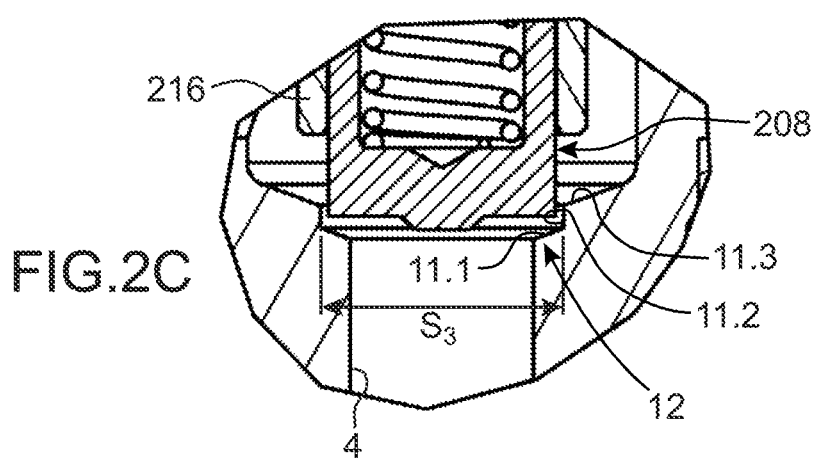
FIG. 2C is a detailed view of FIG. 2B.
Figure 2D:
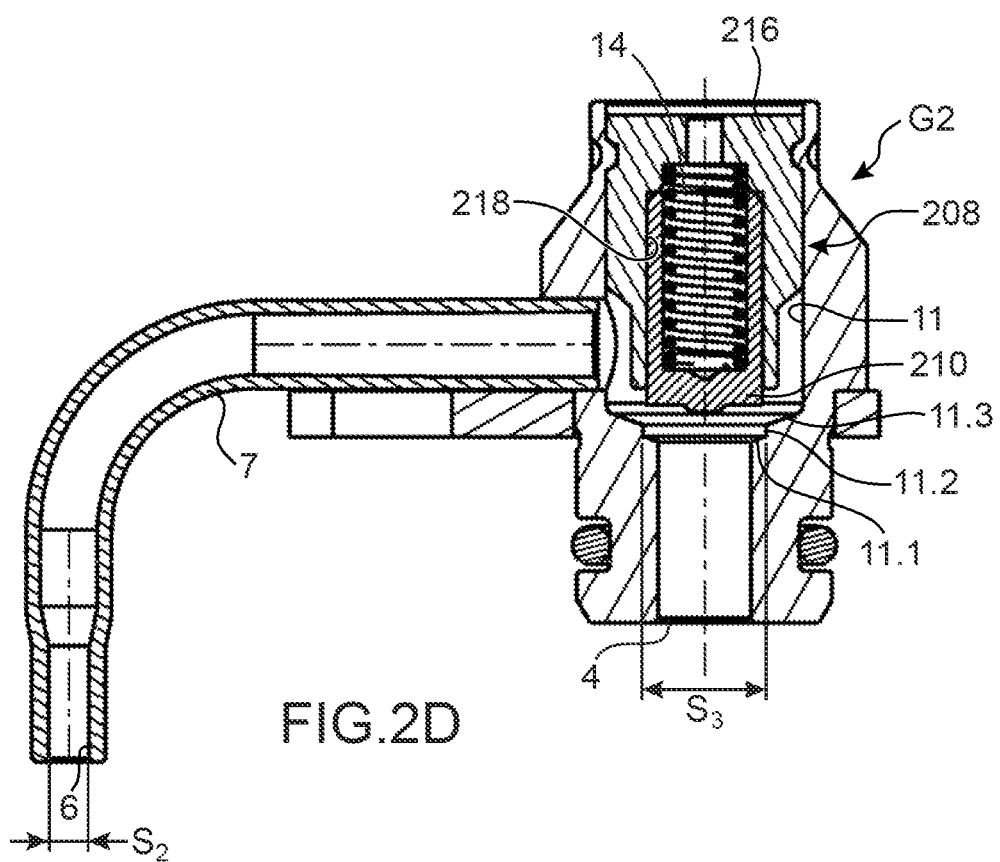
FIG. 2D is a cross-sectional view of the cooling spray jet in FIG. 2A in a second regulation state.

In the position shown in FIG. 1D, in which the plug is at a sufficient distance from the valve seat 12, the cross-sectional area between the reaming and the plug 10 is determined by the third portion 11.3 and the plug 10 and longer by the cylindrical portion. This cross-section is larger than cross-section S2 at the tube discharge outlet and is no longer the limiting section. Section S2 is then the limiting cross-section.

Consequently, when the oil inlet pressure is high enough to move the plug away from the valve seat, the valve has at least two open states in which the oil flow is regulated differently. After the separation phase in which the flow varies quickly, the valve has an open state with a cross-section S3. This state lasts as long as the plug delimits the cross-section S3 with the second cylindrical portion 11.2. Note that when the pressure increases, the plug moves along the axis X away from the valve seat but despite this displacement, together with the reaming it delimits the cross-section S3 for a given pressure range as long as its lower end is facing the second cylindrical portion 11.2.

Since S3 is less than S2, flow is regulated by section S3.

When the pressure increases sufficiently so that the plug 10 moves longitudinally such that the cross-sectional area is defined between the plug 10 and the tapered portion 11.3 that is larger than S2, the flow is regulated by the spray jet outlet section S2.

Operation of the cooling spray jet in FIGS. 1A to 1D will now be described with reference to FIG. 3 showing the flow variation D in l/min as a function of the pressure P in bars.

When the oil supply pressure is less than the pressure P1, the cooling spray jet is closed, the plug 10 is held in contact bearing against the valve seat 12 interrupting flow between the supply inlet 4 and the discharge outlet 6 (portion I.1 in the curve in FIG. 3).

When the oil pressure exceeds the value P2, after the plug separation phase (portion I.2 of the curve in FIG. 3), but is less than a value P3, the plug 10 is sufficiently separated from the valve seat 12 so that it is facing the cylindrical portion 11.2, defining the limiting section S3 with the cylindrical portion 11.2. The outlet flow from the spray jet tube is then controlled by this limiting section S3. The flow variation follows a first linear function (portion I.3 in the curve in FIG. 3).

When the oil pressure exceeds a value P4, (portion I.5 in the curve in FIG. 3), the plug separates further from the valve seat along the longitudinal axis X such that it is no longer facing the cylindrical portion 11.2, the limiting cross-sectional area is then formed by the outlet cross-section S2 of the spray jet tube. The oil flow at the spray jet outlet is then controlled by the cross-section S2.

Portion I.4 between portions I.3 and I.5 between pressures P3 and P4 corresponds to a transient phase during the change in the cross-sectional area from S3 to a section larger than S2.

Figure 5:
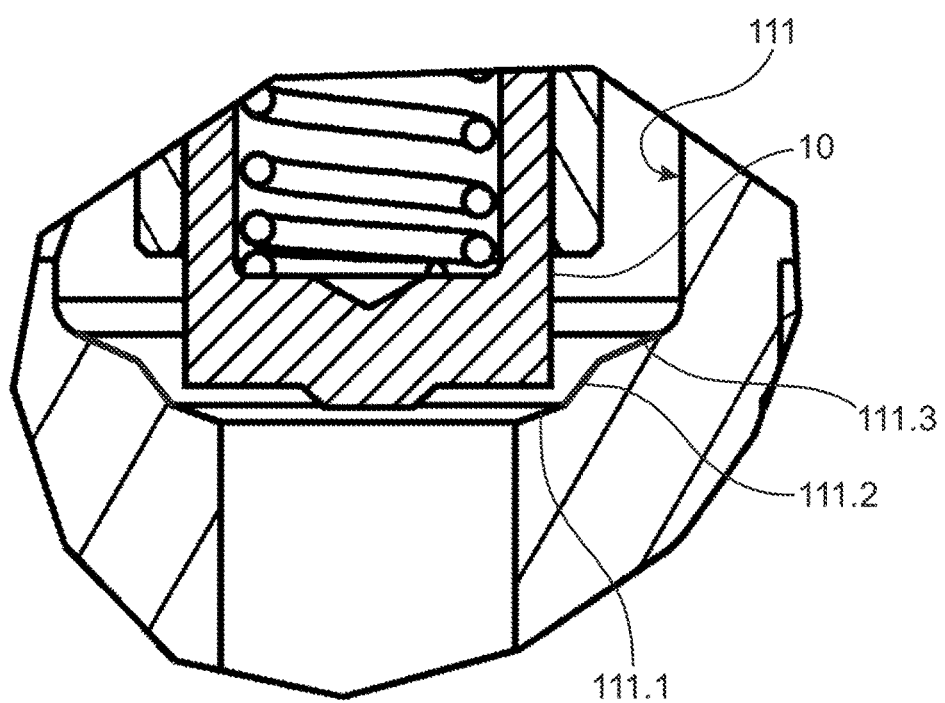
FIG. 5 is a cross-sectional view of a variant embodiment of the cooling spray jet according to the invention in the open state.

The reaming profile visible more particularly in FIG. 1C is not limitative. FIG. 5 shows another example embodiment of a valve seat that is used to create a variable limiting section. In this example embodiment, the reaming 111 comprises a first tapered portion 111.1 that will cooperate with the plug to close the spray jet and a second tapered portion 111.2 that together with the plug delimits a limiting section with a variable value continuously increasing with the oil pressure, and a third tapered portion 111.3 that together with the plug 10 delimits a cross-sectional area greater than section S2.

It would also be possible to envisage a reaming comprising several cylindrical portions 11.2 with an increasing diameter and/or tapered with an angle at the summit increasing along the oil flow direction such that the valve seat together with the plug defines several limiting sections increasing with the oil pressure.

The shape of the valve seat is not necessarily tapered, for example it may be formed by a shoulder.

It would also be possible to envisage that the plug is shaped so as to define the limiting cross-sectional area with the reaming, and it could be envisaged that a central portion of the plug could project outwards on the side of the supply inlet 4. When the pressure is between values P2 and P3, the central portion delimits a limiting section S3 and when the pressure is above the value P4, it no longer limits the flow. The projection may also be stepped to delimit several limiting cross-sectional areas. As a variant, the plug and the reaming may be shaped to vary the cross-sectional area.

FIGS. 2A to 2D show this invention applied to another example of a spray jet G2 according to the invention. This example is different from the example in FIGS. 1A to 1D in the assembly of the valve. This assembly is disclosed in patent FR 2 913 723 issued by the applicant. In this example, the reaming 11 has the same profile as the spray jet G1. The same references are used to denote the same elements.

The spray jet comprises a tubular liner 216 in which there is a through passage 218 in the reaming 11 of the spray jet body. The plug 210 is mounted free to slide in the through passage 218. A spring 14 is installed in the through passage 218 so as to push the plug in contact with the valve seat 212. The valve seat 212 is formed in the body of the spray jet.

This spray jet has the advantage that it has a structure that prevents vibration and wear phenomena during operation and its size in the engine cylinder is reduced, and it has a fewer number of parts that are themselves easier to make, avoiding precise machining operations such as grinding.

Operation of the spray jet in FIGS. 2A to 2D is similar to operation of the spray jet in FIGS. 1A to 1D and will not be described.

Note that the value of the pressure P3 beyond which the flow is regulated by section S2 can easily be fixed, for example as a function of the length of the cylindrical portion 12.2. As the length of this portion along the axis X increases, the required pressure for the plug to go beyond this section increases. Thus, the pressure P3 can be determined by determining the length of this portion. Similarly, if the plug has a projecting element 10.1 that together with the valve seat delimits the limiting cross-section, the length of this projecting portion 10.1 could be used to fix the value of the pressure P3.

As mentioned above, the description is more particularly applicable to a cooling spray jet including means of controlling the supply of oil under pressure, but it will be understood that the control device could be arranged on the upstream side of a spray jet or a plurality of spray jets and control the supply of one spray jet or a plurality of spray jets simultaneously.

It will also be understood that this device can be used in any installation requiring control of its fluid flow as a function of the supply pressure.

Figure 4:
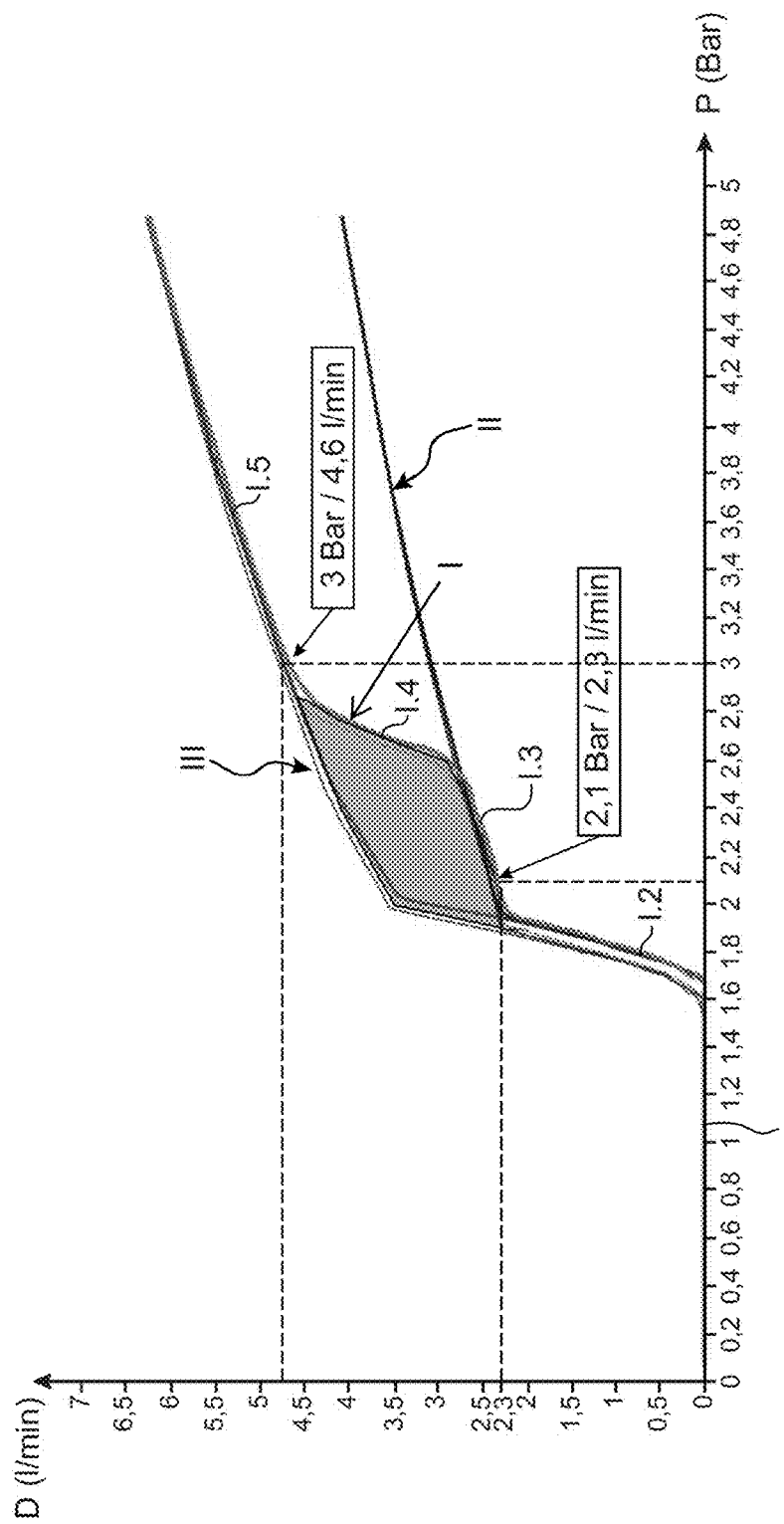
FIG. 4 is a graphic view of the flow variation in l/min at the outlet from the cooling spray jet in FIGS. 2A to 2D as a function of the pressure in bars, and the flow variation as a function of the pressure for a cooling spray jet according to the state of the art, and for a cooling spray jet with an outlet with a larger cross-section.

FIG. 4 shows the variation of oil flow in liter/min. as a function of the oil supply pressure in bars for three different cooling spray jets. Curve I denotes the cooling spray jet shown in figures 1A to 1D and curves II and III denote two cooling spray jets according to the state of the art having discharge outlet sections equal to S3 and S2, respectively. The viscosity of the oil used is 7 cSt.

In the particular example shown, it is required to make a spray jet that keeps a flow of 2.3 l/min at 2.1 bars like the spray jet for which the flow is shown in curve I, but which gives a flow of 4.6 l/min at 3 bars, while the flow in curve II at 3 bars is equal to 3 l/min.

In curve II, it can be seen that the flow variation after the separation phase is a linear function. The spray jet outputs a flow of 2.3 l/min at 2.1 bars and a flow equal to 3 l/min at 3 bars.

The curve I comprises a portion denoted I.1 for a pressure below 1.5 bars corresponding to the closed state of the valve, therefore the outlet flow is zero.

Curve I then comprises a portion denoted I.2 when the pressure is more than 1.5 bars, the plug separates from the valve seat and the flow then increases quickly.

When the separation phase is terminated, the valve is in an open state in which the plug together with the valve seat defines the limiting cross-sectional area S3. The flow variation follows a linear law (portion denoted I.3). The effective flow obtained is 2.3 l /min at 2.1 bars.

When the supply pressure increases further, curve I comprises a portion I.5 corresponding to another open state of the valve during which the plug moves longitudinally relative to the valve seat such that the cross-sectional area is such that the flow is regulated by section S2.

The curve I has a portion I.4 between portion I.3 and I.5 corresponding to a transient phase due to the change in the cross-sectional area.

With the invention, a flow of 4.6 l /min is effectively obtained for a supply pressure of 3 bars without influencing the flow at a pressure of 2.1 bars.

In curve III, the outlet cross-section of the spray jet according to the state of the art is equal to S2 and 4.6 l/min is effectively obtained at 3 bars but the flow is 3.5 l/min at 2.1 bars.

The cross-hatched area shows the reduction in oil consumption due to the invention, compared with a spray jet according to the state of the art with an outlet cross-section S2 (curve III)

With the invention, a cooling spray jet with a relatively complex oil flow variation law can be made capable of providing high oil flows for given pressure values while optimising oil and pump consumption.

The control device may be included in a spray jet like that shown in FIGS. 1A to 2C. It may be arranged between a fluid supply source and several spray jets so as to control the supply to several spray jets at the same time.

The supply control device is particularly suitable for controlling the supply of one or several piston cooling spray jets for an internal combustion engine. But it will be understood that the control device according to this invention can be adapted to any system using fluids and requiring control over the fluid supply.

What is claimed is:

1. Device to control the supply of a fluid from a source under pressure to a system, comprising:
   a supply inlet for the fluid under pressure,
   a discharge outlet for the fluid under pressure, a reaming connecting the supply inlet and the discharge outlet, said discharge outlet having a given cross-sectional area, and
   a valve comprising a plug installed free to slide in said reaming and bearing in contact with a valve seat formed in the reaming in a closed state, said valve also comprising several opening states after a first phase in which the plug separates from the valve seat, each opening state corresponding to a different range of fluid pressure values, the cross-sectional area between the plug and the reaming of each opening state being different from the cross-sectional areas of the other states, at least one of these opening states having a cross-sectional area such that it regulates the fluid flow at the discharge outlet and at least one of these opening states having a cross-sectional area such that the flow is regulated by the cross-sectional area of the discharge outlet.

2. The device according to claim 1, in which the open state with a cross-sectional area such that the flow is regulated by the cross-sectional area of the discharge outlet is the open state for which the range of pressure values includes the highest pressure values.

3. The device according to claim 1, in which the reaming has increasing cross-sectional areas starting from the valve seat along the direction of fluid flow.

4. The device according to claim 1, in which the reaming comprises a first portion forming the valve seat, at least one second portion that together with the plug delimits a cross-sectional area smaller than the cross-sectional area of the discharge outlet and a third portion that together with the plug delimits a cross-sectional area larger than the cross-sectional area of the discharge outlet, said first, second and third portions being arranged in this order along the direction of fluid flow.

5. The device according to claim 4, in which the reaming comprises several second portions, said second portions being arranged along the direction of fluid flow such that together with the plug they delimit increasing cross-sectional areas along the flow direction.

6. Device to control the supply of a fluid from a source under pressure to a system, comprising:
   a supply inlet for the fluid under pressure,
   a discharge outlet for the fluid under pressure, a reaming connecting the supply inlet and the discharge outlet, said discharge outlet having a given cross-sectional area, and
   a valve comprising a plug installed free to slide in said reaming and bearing in contact with a valve seat formed in the reaming in a closed state, said valve also comprising several opening states after a first phase in which the plug separates from the valve seat, each opening state corresponding to a different range of fluid pressure values, the cross-sectional area between the plug and the reaming of each opening state being different from the cross-sectional areas of the other states, at least one of these opening states having a cross-sectional area such that it regulates the fluid flow at the discharge outlet and at least one of these opening states having a cross-sectional area such that the flow is regulated by the cross-sectional area of the discharge outlet,
   in which the reaming comprises a first portion forming the valve seat, at least one second portion that together with the plug delimits a cross-sectional area smaller than the cross-sectional area of the discharge outlet and a third portion that together with the plug delimits a cross-sectional area larger than the cross-sectional area of the discharge outlet, said first, second and third portions being arranged in this order along the direction of fluid flow, and
   in which the second portion has a cylindrical portion and the third portion has a tapered portion.

7. The device according to claim 6, in which the reaming comprises several second portions, said second portions being arranged along the direction of fluid flow such that together with the plug they delimit increasing cross-sectional areas along the flow direction.

8. The device according to claim 4, in which the at least one second portion together with the plug delimits a variable cross-sectional area.

9. The device according to claim 5, in which the at least one second portion together with the plug delimits a variable cross-sectional area.

10. Cooling system for at least one piston of an internal combustion engine comprising at least one cooling spray jet and the device according to claim 1, said control device being located between the source of fluid under pressure and the at least one spray jet, the discharge outlet being formed by a free end of the spray jet.

11. Cooling spray jet for a piston of an internal combustion engine comprising the device according to claim 1, said device being included in the body of the spray jet, the discharge outlet being formed by a free end of the spray jet.

12. The device according to claim 1, wherein the valve prohibits fluid flow at the discharge outlet for a range of fluid pressure values below a minimum pressure value.

* * * * *